United States Patent
Komatsu et al.

(10) Patent No.: US 7,151,066 B2
(45) Date of Patent: Dec. 19, 2006

(54) SILICON NITRIDE ANTI-WEAR MEMBER AND PROCESS FOR PRODUCING THE SAME

(75) Inventors: Michiyasu Komatsu, Yokohama (JP); Kimiya Miyashita, Fujisawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 10/509,088

(22) PCT Filed: Apr. 2, 2003

(86) PCT No.: PCT/JP03/04221

§ 371 (c)(1),
(2), (4) Date: Sep. 28, 2004

(87) PCT Pub. No.: WO03/084895

PCT Pub. Date: Oct. 16, 2003

(65) Prior Publication Data

US 2005/0224763 A1 Oct. 13, 2005

(30) Foreign Application Priority Data

Apr. 4, 2002 (JP) ............................. 2002-102755

(51) Int. Cl.
C04B 35/577 (2006.01)
C04B 35/596 (2006.01)
(52) U.S. Cl. .................. 501/92; 501/97.4; 264/682; 264/683
(58) Field of Classification Search .................. 501/92, 501/97.2, 97.4, 96.3; 252/516, 521.3; 264/682, 264/683

See application file for complete search history.

(56) References Cited

U.S. PATENT DOCUMENTS

| 5,085,806 A | 2/1992 | Yasutomi et al. |
| 6,589,448 B1 * | 7/2003 | Niwa et al. ................. 252/516 |
| 6,642,165 B1 * | 11/2003 | Miyashita et al. ......... 501/97.4 |

FOREIGN PATENT DOCUMENTS

| JP | 58-151371 | 9/1983 |
| JP | 63-30366 | 2/1988 |
| JP | 4-367564 | 12/1992 |
| JP | 5-279130 | 10/1993 |
| JP | 2001-294479 | 10/2001 |
| JP | 2001-335369 | 12/2001 |
| JP | 2002-29847 | 1/2002 |
| JP | 2002-60272 | 2/2002 |
| JP | 2002-060276 | 2/2002 |

* cited by examiner

Primary Examiner—Karl Group
(74) Attorney, Agent, or Firm—Oblon, Spivak, McClelland, Maier & Neustadt, P.C.

(57) ABSTRACT

A silicon nitride wear resistant member is composed of a ceramic sintered body containing 55 to 75 mass % of silicon nitride, 12 to 28 mass % of silicon carbide, 3 to 15 mass % of at least one element selected from the group consisting of Mo, W, Ta, and Nb in terms of silicide thereof, and 5 to 15 mass % of grain boundary phase composed of a rare earth element-Si—Al—O—N, the wear resistant member having an electrical resistance of $10^7$ to $10^4$ Ω·cm, a porosity of 1% or less, and a three point bending strength of 900 MPa or more. The wear resistant member has a predetermined electric resistance (electro-conductivity) in addition to the high strength and toughness inherent in silicon nitride per se, especially has a high sliding characteristic. Also, a method of manufacturing the wear resistant member is provided.

12 Claims, 1 Drawing Sheet

THRUST TYPE ROLLING ABRASION TESTING MACHINE

THRUST TYPE ROLLING ABRASION TESTING MACHINE

SILICON NITRIDE ANTI-WEAR MEMBER AND PROCESS FOR PRODUCING THE SAME

TECHNICAL FIELD

The present invention relates to a wear resistant member containing silicon nitride as a major component and having an appropriate electric resistance and a method of manufacturing the member, and more particularly to a silicon nitride type wear resistant member which has a density equal to or higher than that of a known silicon nitride sintered body, has a mechanical strength inherent in the silicon nitride sintered body itself, and moreover, is excellent in wear resistance, especially, sliding characteristics, and is suitable as a rolling bearing member, and to a method of producing the member.

BACKGROUND ART

Wear resistant members have been applied to various fields, involving, i.e., bearing members, various roller members for rolling or the like, compressor vanes, gas-turbine blades, engine-parts such as cam rollers or the like, and so forth. For the above-described wear resistant members, ceramic materials have been used in addition to metallic materials. Especially, silicon nitride sintered bodies, which are excellent in mechanical strength and wear resistance, have been widely applied to various fields.

As conventional sintering compositions for silicon nitride sintered bodies, a silicon nitride/oxide of rare earth element (yttrium oxide or the like)/aluminum oxide system, a silicon nitride/oxide of rare earth element (yttrium oxide or the like)/aluminum oxide/titanium oxide system, a silicon nitride/yttrium oxide/aluminum oxide/aluminum nitride/oxides of titanium, magnesium, and zirconium system, and so forth are known. The addition of the sintering assistant agents of the oxide of rare earth elements to the above-described sintering compositions is carried so that grain boundary phases (liquid phase) composed of Si-rare earth element-Al—O—N and the like are formed during the sintering, and, thus, the densities and the strengths of the sintered bodies are enhanced.

For mass production of the known silicon nitride sintered bodies, the above-described sintering assistant agents as additives are added to powdery silicon nitride raw materials and molded, and the molded pieces are sintered in a firing furnace at a temperature of about 1,650 to 1,900° C. in a predetermined period of time.

The silicon nitride sintered bodies are ceramics having higher sliding characteristics compared to the other wear resistant members using the silicon nitride sintered bodies described above, and, thus, have been practically applied to bearing members, especially, to bearing balls. The bearings are used in various fields, and started to be reviewed to use as an important protection safety parts. For this reason, the reliabilities of the bearing members of silicon nitride sintered bodies, i.e., those of rolling members such as balls, rollers or the like are required to be further enhanced.

For example, defects such as flaws and cracks formed on a surface of the rolling member will result to a breakage of not only the bearing per se but also an entire system using the bearing member. Therefore, there is adopted a manufacturing process for excluding or eliminating such defects as completely as possible. In a similar way, pores or the like existing near the surface of the rolling body would be a cause of deteriorating the reliability of the bearing member. Thus, the pores are removed at a process when the bearing member is worked out into a product having a final shape.

The silicon nitride sintered body produced in the known method has a bending strength, a fracture toughness, and a wear resistance improved to some degree. However, the sintered body is an electrical insulator. Therefore, example, in the case in which the sintered body is used as a bearing ball in the rotary portion of a hard disc drive device (HDD), the static electricity generated when the bearing ball is rotated at a high speed could not be effectively dissipated into the ball bearing portion. Thus, undesirably a large quantity of static electricity may be time-dependently accumulated. Thus, it has been observed that problems occur in that the hard disc drive device (HDD) can not normally be operated.

On the other hand, silicon nitride sintered bodies having a low electric resistance, i.e., a electric resistance of about $10^{-2}$ Ω·cm are known, and are mainly used as a cutting tool or the like. However, to render a low electric resistance, a large amount of conductivity-rendering particles of carbides or the like are added. Thus, the particles tend to aggregate with each other. Thus, problems occur in that the bending strength and the fracture toughness are easily deteriorated. Moreover, in the case where the silicon nitride sintered bodies are applied to bearing balls or the like which suffer compression loads from all of the directions thereof, problems occur in that cracks tend to be formed in the sites where large number of aggregate particles described above exist, so that the sliding characteristic decreases is a short time. Accordingly, for the sintered bodies which are used under the condition that they suffer a compression load from all of the directions thereof, it is desired that the number of the aggregate particles is as small as possible.

To solve the above-described problems, the present invention has been devised. It is an object of the present invention to provide a silicon nitride type wear resistant member which has a predetermined electric resistance (electroconductivity) in addition to a high strength and fracture toughness inherent in the silicon nitride per se, and especially has a superior sliding characteristic and to provide a method of producing the member.

DISCLOSURE OF INVENTION

In order to attain the objects described above, the types of silicon nitride powder, the types of electroconductivity rendering particles, the types and the addition amounts of sintering assistant agents, and firing-conditions, which are generally employed for production of conventional silicon nitride sintered bodies, were varied, and the effects and the influences of these factors on the characteristics of the sintered bodies were experimentally compared and examined.

As a result, the experiments provided the following findings. That is, silicon carbide, at least one compound of the carbides, the oxides, the borides, and the silicides of Mo, W, Ta, and Nb, the oxide of a rare earth element, alumina, and aluminum nitride, titanium oxide, or the like, if necessary, in predetermined amounts are added to a fine material of silicon nitride to form a material mixture. The material mixture is molded to form a compact. The compact is degreased. The compact, after or before it is sintered, is subjected to a hot isostatic pressing (HIP) treatment. Thereby, the silicon carbide and at least one compound selected from the group consisting of the suicides of Mo, W, Ta, and Nb are formed into a composite and dispersed, and, moreover, the grain boundary phase is composed of a rare earth element-Al—O—N. Thus, a silicon nitride sintered body which has a predetermine electric resistance and, especially, a superior sliding property, in addition to the high strength and fracture toughness characteristics, and is suitable as a wear resistance member can be obtained. The present invention has been devised based on the above-described findings.

Characteristically, the silicon nitride wear resistant member of the present invention is composed of a ceramic sintered body containing 55 to 75 mass % of silicon nitride, 12 to 28 mass % of silicon carbide, 3 to 15 mass % of at least one element selected from the group consisting of Mo, W, Ta, and Nb, and 5 to 15 mass % of grain boundary phase of a rare earth element-Si—Al—O—N, the wear resistant member having an electrical resistance of $10^7$ to $10^4$ Ω·cm, a porosity of 1% or less, and a three point bending strength of 900 MPa or more.

Preferably, the wear resistant member has a fracture toughness of 6.0 MPa·m$^{1/2}$ or more. Also, preferably, the wear resistant member contains 5 mass % or less of at least one element selected from the group consisting of Ti, Hf, and Zr in terms of the oxide thereof.

In the silicon nitride wear resistant member, a rolling life defined as a rotation number of steel balls rolling along a circular track formed on the wear resistant member formed of the silicon nitride sintered body until a surface of the silicon nitride wear resistant member peels off may be $1 \times 10^7$ or more, when the rolling life is measured in such a manner that a circular track having a diameter of 40 mm is set on the upper surface of the plate-shaped wear resistant member, three rolling steel balls each having a diameter of 9.525 mm and composed of SUJ2 are provided on the circular track, thereby to form a thrust type bearing testing machine, and the rolling steel balls are rotated on the track at a rotation speed of 1200 rpm under a condition of being applied with a load of 3.92 KN.

Moreover, in the silicon nitride wear resistant member, the silicon nitride sintered body may have a crush strength of 200 MPa or more, and a rolling fatigue life defined as a time until a surface of rolling balls composed of the silicon nitride wear resistant member rolling along a circular track on a steel plate peels off may be 400 hours or more, when the rolling fatigue life is measured in such a manner that three rolling balls each having a diameter of 9.525 mm are formed from the silicon nitride wear resistant member, the three rolling balls are provided on the circular track having a diameter of 40 mm set on the upper surface of a steel plate formed of SUJ2, thereby to form a thrust type bearing testing machine, and the rolling ball are rotated at a rotation speed of 1200 rpm on the track under a condition of being applied with a load so as to impact a maximum contact stress of 5.9 GPa to the balls.

Referring to a method of measuring the abrasion resistance (rolling fatigue life) of the wear resistant member having a ball-shape, the ball-diameter of 9.525 mm (=⅜ inch) is employed as a standard value. The present invention is not restricted to this ball-size. For example, in the case where the ball size is not 9.525 mm (=⅜ inch), the maximum contact stress must be changed corresponding to the size of the ball. Referring to the change of the maximum contact stress, the unit of Pa is expressed by 1 Pa=$1.02 \times 10^{-5}$ kgf/cm$^2$, and thus, the maximum contact stress shall be proportionally calculated corresponding to the size of a ball to be measured. It is to be noted that the rolling fatigue life is 400 hours or more, even if the wear resistant member of the present invention has a ball-size different from the above-described value.

Characteristically, the method of manufacturing a wear resistance member of the present invention includes the steps of: preparing a material mixture by adding 12 to 28 mass % of silicon nitride, 3 to 15 mass % of at least one compound selected from the group consisting of the carbides, the silicides, and the oxides of Mo, W, Ta, and Nb in terms of the silicide thereof, 2 to 10 mass % of a rare earth element in terms of the oxide thereof, 2 to 10 mass % of aluminum in terms of the oxide thereof, and 5 mass % or less of at least one element selected from the group consisting of Ti, Hf, and Zr to silicon nitride powder containing 1.7 mass % or less of oxygen and 90 mass % or more of α phase type silicon nitride, and having an average grain size of 0.1 μm or less; molding the material mixture to form a compact; degreasing the compact; and sintering the compact in a non-oxidizing atmosphere at a temperature of 1850° C. or lower.

Preferably, the method of manufacturing a silicon nitride wear resistant member further includes a step of conducting a hot isostatic pressing treatment (HIP) in a non-oxidizing atmosphere of 30 MPa or more at a temperature of 1800° C. or lower after completion of the sintering step.

According to the above-described manufacturing method, in the preparation of the silicon nitride sintered body to constitute the wear resistant member, predetermined amounts of the silicon carbide, the Mo compound and the like as electro-conductivity rendering particles are added to the silicon nitride material powder. The compact formed of the obtained material mixture is degreased and sintered under predetermined conditions. Thus, the silicon carbide or the like is dispersed in the silicon nitride sintered body. Thus, a predetermined electric resistance ($10^7$ to $10^4$ Ω·cm) is obtained. Thus, the wear resistant member has an electroconductive property with which the generation of static electricity can be effectively suppressed.

Moreover, the Mo compound or the like is remarkably effective in rendering a predetermined electric resistance when it is used together with the silicon carbide. Moreover, with the Mo compound or the like, the content of silicon carbide can be reduced. Thereby, the deterioration of the sintering property, and the decrease of the bending strength, the fracture toughness and the sliding property of the sintered body can be effectively improved. Also, the release of grains occurring when the ball formed of the sintered body is ground can be significantly improved.

Moreover, the sintering property is less reduced. Therefore, the size of pores in the crystal texture can be reduced to be extremely small. Thus, the pores which tend to act as starting points of the fatigue breakage when stress is applied to the wear resistant member decreases in number. Thus, the wear resistant member having superior fatigue life and durability can be obtained. Moreover, the grain boundary phase containing the rare earth element or the like is formed in the silicon nitride crystal texture. The maximum pore size in the grain boundary phase is 0.3 μm or less. The porosity is 1% or less. The three point bending strength at room temperature is 900 MPa or more. The fracture toughness is 6.0 MPa·m$^{1/2}$ or more. The crushing strength is 200 MPa or more. Thus, the silicon nitride wear resistant member having superior mechanical characteristics can be easily provided.

Preferably, as the silicon nitride powder which is used according to the manufacturing method of the present invention, and is a major component of the silicon nitride sintered body constituting the wear resistant member, fine silicon nitride powder is used which contains 75 to 97 mass %, preferably, 80 to 95 mass % of α phase type silicon nitride having an oxygen content of 1.5 mass % or less, preferably, 0.5 to 1.2 mass %, and has an average grain size of 1.0 μm, preferably, about 0.4 to 0.8 μm.

If silicon nitride powder having an amount of oxygen as impurities of 1.5 mass % or more, the oxygen concentration increases in the whole of the sintered body, the porosity increases, and so forth. Therefore, the strength of the silicon nitride sintered body is easily reduced. More preferably, the oxygen content of the silicon nitride material powder is in the range of 0.5 to 1.2 mass %.

As the silicon nitride material powder, α-phase and β-phase powders have been known. The sintered body formed of the α-phase type silicon nitride material powder has a tendency in that the strength thereof is insufficient. In the case of the α-phase type silicon nitride material powder, firing at high temperature is required. The sintered body having a high strength can be obtained in which silicon nitride crystal grains with a high aspect ratio are incorporated in different ways. Therefore, according to the present invention, suitably, the α-phase type material powder is fired at high temperature, and as the silicon nitride sintered body, a sintered body containing the α-phase type silicon nitride crystal grains is used.

In the wear resistant member of the present invention, the content of silicon nitride is in the range of 55 to 75 mass %. The reason is as follows. That is, in the range of the content of 55 mass % or more, the strength, the fracture toughness, and the rolling life of the sintered body are significantly enhanced, and the excellent characteristics of silicon nitride are exhibited. On the other hand, the range is set to be up to 75 mass % considering the electric resistance of the sintered body. Preferably, the content is in the range of 60 to 70 mass %.

As a result, from the standpoints of the sintering property, the bending strength, the fracture toughness, and the rolling life, it is preferable that fine silicon nitride powder with an oxygen content of 1.5 mass % or less, preferably, 0.5 to 1.2 mass %, an α-phase type silicon nitride content of 90 mass % or more, and an average grain size of 1.0 μm or less, preferably, about 0.4 to 0.8 μm is used.

In particular, when the fine material powder with an average grain size of 0.7 μm or less is used, a tight sintered body with a porosity of 0.5% by volume can be formed even if the amount of the sintering assistant agent is small. The porosity of the sintered body can be easily determined by the Archimedes' method.

The silicon carbide contained as electro-conductivity rendering particles is dispersed in the silicon nitride crystal texture in a single form, and has a function to render a predetermined electric resistance. If the content of the silicon carbide is less than 12 mass %, the effect is insufficient. On the other hand, if the content exceeds 28 mass %, i.e., is excessive, probably, the sintering property is deteriorated, the bending strength, the fracture toughness, and the sliding characteristic are reduced, and moreover, grains are released when the sintered body is ground to be formed into a ball. Thus, the content is set to be in the range of 12 to 28 mass %. Preferably, the content is in the range of 15 to 25 mass %. Two types of silicon carbide, that is, α-, β-types of silicon carbide exist. Both types have the same effects and operation.

Referring to the silicide of at least one element selected from the group consisting of Mo, W, Ta, and Nb contained in the sintered body as other electro-conductivity rendering particles, the use of the silicide together with the silicon carbide is remarkably effective in rendering a predetermined electric resistance to the sintered body. Moreover, with the suicides of the above-described elements, the content of the silicon carbide can be relatively reduced. Accordingly, the silicides exhibit significant effects and operation when the deterioration of the sintering property, the reduction of the bending strength, the fracture toughness, and the sliding characteristic, and the release of grains at the grinding to form a ball prevented or improved.

In the case where the content of at least one element of Mo, W, Ta, and Nb is less than 3 mass % in terms of the silicide, the effect of the addition is insufficient. On the other hand, if the content exceeds 15 mass %, i.e., is excessive, the sintering property is deteriorated, and the bending strength, the fracture toughness, and the sliding characteristic are reduced. Thus, the content is set to be in the range of 3 to 15 mass %. Preferably, the content is in the range of 5 to 13 mass %.

The elements of Mo, W, Ta, and Nb exit as the silicides in the wear resistant member of the present invention. However, in the material steps thereof, these elements may be added as various compounds. As the compounds which are converted to the silicides, the carbides, the oxides, and the borides of Mo, W, Ta, and Nb are exemplified in addition to the silicides of these elements. These compounds, when they are added to the silicon nitride powder and sintered, react with the silicon component of the silicon nitride to become the silicides. Of the above-described compounds, the Mo silicides have a superior improvement effect, and is suitably used. Needless to say, the suicides include carbon silicides.

According to the present invention, the electric resistance of the wear resistant member is adjusted in the range of $10^7$ to $10^4$ Ω·cm. If the electric resistance exceeds $10^7$ Ω·cm, i.e., is excessive, it will be difficult to prevent static-electricity from being charged to a bearing ball formed of the wear resistant member, when the bearing ball is slid so that the static electricity is generated. On the other hand, in the case where the electric resistance of the wear resistant member is less than $10^4$ Ω·cm, a large amount of the electro-conductivity rendering particles are contained in the silicon nitride sintered body, although the static-electricity can be prevented from being charged. Thus, undesirably, the advantages inherent in silicon nitride, i.e., the high abrasion resistance and strengths can not be sufficiently exhibited.

In the case where a rare earth element oxide is used as a sintering assistant agent, a grain boundary phase of the rare earth element-Si-A—O—N is formed in the silicon nitride sintered body texture. The gain boundary phase is composed of a rare earth element-Si—Al—O—N glass or crystalline compound, which is formed by use of, e.g., a rare earth element oxide, aluminum oxide, aluminum nitride, and so forth. The gain boundary phase is effective in increasing the density of the silicon nitride sintered body texture, so that the characteristics of the wear resistant member can be improved. If the amount of the formed grain boundary phase is less than 5 mass %, the enhancement of the density of the silicon nitride will be insufficient. On the other hand, if the amount exceeds 15 mass %, i.e., is excessive, the bending strength, the fracture toughness, and the sliding characteristic of the sintered body will be reduced. Thus, the content is set in the range of 5 to 15 mass %. Preferably, the content is in the range of 7 to 13 mass %.

Referring to a rare earth element added to the silicon nitride material powder as a sintering assistant agent, the oxides of Y, Ho, Er, Yb, La, Sc, Pr, Ce, Nd, Dy, Sm, Gd, or the like, or substances which are converted to the above-described oxides by the sintering operation may be added in a single form or in combination of at least two oxides. The sintering assistant agent reacts with the silicon nitride material powder to form a liquid phase, and functions as a sintering accelerator.

The amount of the sintering assistant agent added is set in the range of 2 to 10 mass % of the material powder in terms of the oxide. If the amount is less than 2 mass %, the enhancement of the density and strength of the sintered body will be insufficient. Especially, in the case where the rare earth element is an element with a large atomic weight such as one of lanthanoids, a sintered body having a relatively low strength and a relatively low thermal conductivity is formed. On the other hand, if the amount exceeds 10 mass %, i.e., is excessive, an excess of the grain boundary phase is formed. Thus, the amount of the pores generated increases, and the strength tends to be reduced. Thus, the amount of the sintering assistant agent added is set in the above-described range. Especially, for the above-described reason, preferably, the amount is in the range of 2 to 8 mass %.

The oxide ($Al_2O_3$) of aluminum as an additive component selectively added according to the present invention promotes the function of the above-described rare earth element used as a sintering accelerator, can enhance the density at low temperature, and has a function to control the growth of grains in the crystal texture. Thus, the Al oxide is added in an amount-range of 5 mass % or less for enhancement of the mechanical strengths of the $Si_3N_4$ sintered body such as the bending strength, the fracture toughness, or the like. If the amount of Al added is less than 0.2 mass % in terms of the oxide, the effects of the addition will be insufficient. On the other hand, if the amount exceeds 5 mass %, i.e., is excessive, the oxygen content will increase. Thus, the amount is set in the range of 5 mass % or less, preferably, 0.2 to 5 mass %. Desirably, the amount is in the range of 0.5 to 3 mass %.

Moreover, the aluminum nitride (AlN) selectively added as another additive has a function to suppress the silicon nitride from evaporating off during the sintering process and to further enhance the function of the above-described rare earth element as a sintering accelerator. Desirably, the aluminum nitride is added in an amount of 5 mass % or less.

In a case in which the amount of AlN added is less than 0.1 mass %, the sintering needs to be carried out at higher temperature. If the amount exceeds 5 mass %, i.e., is excessive, an excess of the grain boundary phase will be formed, or the AlN tends to be solid-dissolved into the silicon nitride, so that the number of pores increases, and the porosity increases. Therefore, the amount is set in the range of 5 mass % or less. In particular, to assure the superior performances, i.e., the sintering property, the strength, and the rolling life, desirably, the amount is set in the range of 0.1 to 3 mass %.

In the wear resistant member of the present invention, compounds of Ti, Hf, and Zr may be used as other additives, if necessary. At least one compound selected from the group consisting of the oxides, the carbides, the nitrides, and the suicides of Ti, Hf, and Zr has a function to further promote the function of the rare earth element oxide or the like as a sintering accelerator and also to enhance the mechanical strength of the sintered body. It the amount of the compound added is less than 0.5 mass % in terms of the oxide, the effects of the addition will be insufficient. On the other hand, if the amount exceeds 5 mass %, i.e., is excessive, the strength of the sintered body will be reduced. Thus, the amount is set in the range of 5 mass % or less. Preferably, the amount is in the range of 1 to 3 mass %.

Moreover, the compounds of Ti, Mo, or the like also function as a light shielding agent to black-color the silicon nitride ceramic sintered bodies and thus make opaque them.

The porosity of the sintered body exerts a great influence over the rolling life and the strength of the wear resistant member. Thus, the wear resistant member is produced in such a manner as to have a porosity of 1.0% or less. If the porosity exceeds 1.0%, the number of pores at which the fatigue breakage starts rapidly increases. Thus, the rolling life of the wear resistant member is reduced, and moreover, the strength of the sintered body decreases. Preferably, the porosity is set in the range of 0.5% or less.

To obtain the silicon nitride sintered body which has a porosity of 1.0% or less as described above and a predetermined roiling life by measurement with a thrust type rolling abrasion testing machine (thrust type bearing testing machine), it is important that the silicon nitride compact formed with the prepared material mixture is degreased, and then sintered at a temperature of 1850° C. or lower for about 2 to 10 hours at ordinary pressure or under pressure. The porosity can be further reduced by gradually cooling the sintered body at a cooling speed of 100° C. or lower per hour immediately after the completion of the sintering operation.

Especially, the compact is held at a temperature of 1250 to 1600° C. for 0.5 to 10 hours during the sintering process, so that the concentration of oxygen in the liquid phase (grain boundary phase) is reduced, and the melting point of the liquid phase is enhanced. Thus, the generation of bubble-like pores at melting of the liquid phase can be suppressed. The maximum pore size can be reduced until it becomes extremely small. Thus, the rolling life can be improved. The above-described holding operation, when it is carried out at a temperature of 1350 to 1450° C. in a vacuum atmosphere, is significantly effective. The same effects can be also exhibited when the holding operation is carried out at a temperature of 1500 to 1600° C. in a nitrogen atmosphere.

When the sintered body is gradually cooled at a cooling speed of 100° C. or lower per hour to reach the temperature at which the liquid phase is solidified after the sintering, the reduction of the oxygen concentration of the liquid phase can be further accelerated. Thus, the sintered body of which the rolling life is improved can be obtained.

If the sintering temperature is less than 1650° C., the enhancement of the density of the sintered body will be insufficient, so that the porosity exceeds 1.0 vol. %. Thus, both of the mechanical strengths and the rolling life are reduced. On the other hand, if the sintering temperature exceeds 1850° C., the silicon nitride per se is easily evaporated off and decomposed. Especially, in the case where the sintering is carried out not under pressure but at ordinary pressure, the evaporation and decomposition of the silicon nitride starts about at 1800° C.

The cooling speed of the sintered body applied immediately after the completion of the sintering operation is a control factor for reducing the pore size and crystallizing the grain boundary phase. If rapid cooling, e.g., at a cooling speed of 100° C. or higher is carried out, the grain boundary phase of the sintered body texture will be non-crystalline (glass phase). Thus, the reduction of the oxygen concentration of the liquid phase formed in the sintered body becomes insufficient. Thus, the rolling life of the sintered body is reduced.

The range of temperature in which the cooling speed should be strictly adjusted may be a range of from a predetermined sintering temperature (1650 to 1850° C.) to the temperature at which the liquid phase formed by the above-described reaction of the sintering assistant agent is solidified. It is to be noted that the solidification point of the liquid phase when the above-described sintering assistant agent is used is in the range of about 1600 to 1500° C. Thus, the cooling speed of the sintered body at least in the range of from the sintering temperature to the solidification temperature of the liquid phase is controlled to be 100° C. or lower per hour, preferably, 50° C. or lower per hour, and more preferably, 25° C. or lower per hour. Thereby, the maximum pore size becomes 0.3 µm or less, and the porosity becomes 0.5% or less. Thus, the silicon nitride sintered body having superior rolling life and durability characteristics can be produced.

The silicon nitride sintered body to constitute the wear resistant member of the present invention is produced, e.g., by the following processes. That is, predetermined amounts of the sintering assistant agent, the electro-conductivity rendering particles (silicon carbide, the Mo compounds, or the like), additives such as an organic binder and the like, and compounds such as $Al_2O_3$, AlN, Ti, and the like, if necessary, are added to the fine silicon nitride powder having a predetermined fine grain size as described above, and a small oxygen content. Thus, the material mixture is prepared. The obtained material mixture is molded to form a compact having a predetermined shape and size.

As a method of molding the material mixture, known molding methods such as general-purpose uni-axially pressing, mold-pressing, doctor-blade, rubber-press, a CIP method, and so forth may be employed.

In the case where a compact is formed by the mold-pressing method, it is necessary to set the molding pressure of the material mixture at 120 MPa or more so as to form such a grain boundary phase as generates pores with much difficulty especially after the sintering. If the molding pressure is less that 120 MPa, the sites will be easily formed in which the cohesion of the rare earth element compound as a main component for forming the grain boundary phase occurs. The density of the compact can not be enhanced. Thus, a sintered body which tends to be often cracked is formed. The fatigue breakage easily starts at the sites where the cohesion occurs in the grain boundary phase. Thus, the life and the durability of the wear resistant member are reduced. On the other hand, if the molding pressure exceeds 200 MPa, i.e., is excessive, the service life of the mold becomes short. Thus, the production condition is not necessarily superior. Thus, preferably, the molding pressure is in the range of 120 to 200 MPa.

Subsequently to the molding operation, the compact is heated in a non-oxidizing atmosphere at a temperature of 600 to 800° C. or in the air at a temperature of 400 to 500° C. for 1 to 2 hours, so that the organic binder added in advance is sufficiently removed for degreasing.

Then, the degreased compact is sintered in an inert gas atmosphere of nitrogen gas, argon gas, or the like at a temperature of 1650 to 1850° C. at ordinary pressure or under pressure. As a press-sintering method, atmospheric pressure sintering, hot press, HIP treatment, and so forth may be used.

Moreover, after the sintering, the formed silicon nitride sintered body is subjected to hot isostatic pressing (HIP) treatment in a non-oxidizing atmosphere of 30 MPa or more at a temperature of 1800° C. or lower. Thereby, the influences with the pores of the sintered body at which the fatigue breakage starts can be further reduced. Thus, the wear resistant member of which the sliding and rolling life characteristics are further improved is obtained.

Especially, in the case where the wear resistant member is applied to a bearing member such as a bearing ball, it is useful to carry out the HIP treatment after the sintering at ordinary temperature or under pressure.

The silicon nitride wear resistant member produced by the above-described method has a porosity of 1.0% or more, and superior mechanical characteristics, i.e., a three point bending strength at ordinary temperature of 900 MPa or more.

Moreover, the wear resistant member having a crushing strength of 200 MPa or more and a fracture toughness of 6.0 MPa·m$^{1/2}$ or more can be obtained. According to the wear resistant member and the method of producing the same of the present invention, in preparation of the silicon nitride sintered body to constitute the wear resistant member, predetermined amounts of silicon carbide, a Mo compound, and the like as electroconductivity rendering particles are added to the silicon nitride material powder, and the compact formed of the obtained material mixture is degreased and sintered under the specified conditions. Thus, the silicon carbide or the like is dispersed in the crystal texture of the silicon nitride sintered body, so that a predetermined electric resistance ($10^7$ to $10^4$ Ω·cm) is obtained. Thus, the electro-conductivity at which the generation of static electricity can be effectively suppressed is rendered.

Moreover, the silicon carbide and the Mo compound, and the like are added together in the predetermined amounts. Therefore, the sintering property is hardly deteriorated, and the generation of pores is suppressed, so that the porosity can be reduced to an extremely small value. Thus, the wear resistant member which is hardly affected by static electricity, and has a high rolling life characteristic and a superior durability is obtained. Therefore, in the case in which a bearing unit is produced in which the wear resistant member is employed as a rolling bearing member, the sliding rolling characteristic can be kept on a high level for a long time-period. Thus, rotation devices having superior operation-reliability and durability can be provided. Regarding other uses, the present invention can be applied in various different fields such as engine parts, various jigs and tools, various rails, various rollers or the like that require the wear resistance.

Especially, the silicon nitride sintered body used in the present invention is effectively applied to wear resistant members. As the wear resistant members to which the present invention can be applied, bearing members, rollers for rolling, compressor vanes, gas turbine blades, engine parts such as cam rollers, and so forth are exemplified. Especially, the present invention is effectively applied to bearing members (rolling bodies) such as bearing balls of which the whole surfaces function as sliding portions.

Especially, in the case in which the bearing member is used as a bearing ball in the rotary portion of a hard disc drive device (HDD), the static electricity generated when the bearing ball is rotated at a high speed can be effectively dissipated via the bearing ball into the rotation shaft portion, the ball bearing portion, and so forth which are made of metals such as a bearing steel or the like. Thus, a large quantity of static electricity can be prevented from being time-dependently accumulated. Thus, stored data are not damaged. Effectively, the hard disc drive device (HDD) can normally be operated in ordinal conditions.

Needless to say, the silicon nitride sintered body for use as a wear resistant member may be finishing-worked, e.g., for surface-grinding, surface-coating, and so forth. In other words, in the case where the silicon nitride sintered body itself can be used as a wear resistant member, the silicon nitride sintered body is defined as the wear resistant member.

[REFERENCE NUMERALS]

Figure 1:
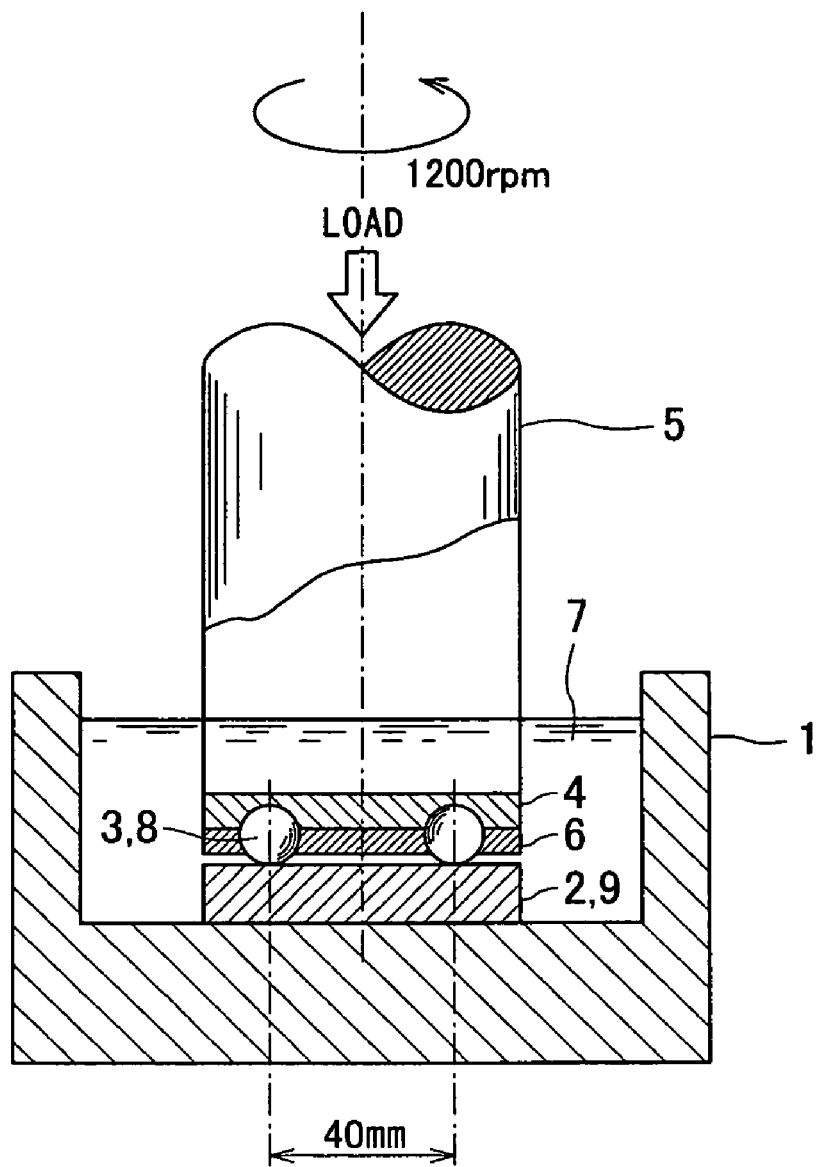
FIG. 1 is a cross-sectional view showing the structure of a thrust-type rolling abrasion (wear) testing machine for measuring rolling life characteristics of the silicon nitride type wear resistant member of the present invention.

1—machine body, 2—wear resistant member, 3—rolling steel ball, 4—guide plate, 5—driving rotation shaft, 6—retainer, 7—lubricating oil, 8—rolling ball (made of silicon nitride), 9—bearing steel plate (made of SUJ2).

BEST MODE FOR CARRYING OUT THE INVENTION

Hereinafter, embodiments according to the present invention will be specifically described with reference to the below-described Examples.

EXAMPLE 1

A material mixture for Example 1 was prepared by adding 16 mass % of β-type silicon carbide powder (SiC) having an average grain size of 0.6 μm and 10 mass % of molybdenum carbide powder ($Mo_2C$) having an average grain size of 1 μm, as electro-conductivity rendering particles, and 4 mass % of $Y_2O_3$ (yttrium oxide) having an average grain size of 0.9 μm, 3 mass % of $Al_2O_3$ (alumina) powder having an average grain size of 0.7 μm, 2 mass % of AlN (aluminum nitride) powder having an average grain size of 1.0 μm, and 1 mass % of $TiO_2$ (titanium oxide) having an average grain size of 0.5 μm to 64 mass % of $Si_3N_4$ (silicon nitride) powder containing 1.1 mass % of oxygen and 97 mass % of α-phase type silicon nitride and having an average grain size of 0.55 μm, followed by wet-mixing the materials in ethyl alcohol using silicon nitride balls for 96 hours, and drying the mixture, thereby to prepare a material mixture.

After adding a predetermined amount of an organic binder to the formed material powder mixture, thereby to prepare a blended granulated mixture. The granulated mixture was press-molded at a molding pressure of 130 MPa, thereby to prepare a number of compacts having a dimension of 50 mm (length)×50 mm (width)×5 mm (thickness) for use as samples for measuring bending strength and a number of disc-shaped compacts having a dimension of 80 mm (diameter)×6 mm (thickness) for use as samples for measuring rolling life.

Thereafter, the formed compacts were degreased in an air-stream at a temperature of 450° C. for 4 hours, and sintered in a nitrogen gas atmosphere under a pressure of 0.7 MPa at a temperature of 1800° C. for 4 hours. Thereafter, the sintered bodies were subjected to hot isostatic pressing (HIP) treatment in which the sintered bodies were heated in a nitrogen gas atmosphere under pressure of 98 MPa at a temperature of 1700° C. for 1 hour. Thereby, silicon nitride sintered body wear resistant members for Example 1 were prepared.

COMPARATIVE EXAMPLES 1–3

As Comparative Example 1, the manufacturing steps were repeated under the same conditions as in Example 1 except that the SiC powder and the $Mo_2C$ powder were not added as electro-conductivity rendering particles, thereby to prepare the silicon nitride sintered body wear resistant members for Comparative Example 1. In Comparative Example 2, the manufacturing steps were repeated under the same conditions as in Example 1 except that the $Mo_2C$ powder was not added as electro-conductivity rendering particles, thereby to prepare the silicon nitride sintered body wear resistant members for Comparative Example 2. Moreover, in Comparative Example 3, the manufacturing steps were repeated under the same conditions as in Example 1 except that the SiC powder was not added as electro-conductivity rendering particles, thereby to prepare the silicon nitride sintered body wear resistant members for Comparative Example 3.

With respect to thus prepared silicon nitride type wear resistant members for Examples 1 and Comparative Examples 1 to 3, measurement was made on the porosity, the three-point bending strength at room temperature, the fracture toughness by the Niihara system according to the micro-indentation method, the electric resistance, and the rolling life (repeated cycle number) using a thrust type rolling abrasion testing machine shown in FIG. 1.

The porosity of the sintered bodies was measured by Archimedes' method. The measurement limit of the Archimedes' method is 0.01%. The porosities below this value are expressed as "up to 0.01%".

Regarding the three-point bending strength, test pieces having a dimension of 3 mm×40 mm×4 mm in thickness were prepared from the respective sintered bodies. The measurement was carried out under the condition in which the span (distance between supporting points) was set at 30 mm and the load application speed was set at 0.5 mm/min.

The upper and lower surfaces of the respective samples were cut. Electrodes were set on the upper and lower flat surfaces. The electric resistances of the samples were measured at room temperature (25° C.) by means of an insulation resistance meter.

The rolling characteristics of the respective wear resistant members were measured by means of a thrust type rolling abrasion testing machine shown in FIG. 1. The testing machine comprises a plate-shaped wear resistant member 2, a plurality of rolling steel balls 3 disposed on the upper surface of the wear resistant member 2, a guide plate 4 disposed on an upper portion of the rolling steel balls 3, a driving rotation shaft 5 connected to the guide plate 4, and a retainer 6 for regulating a location interval of the rolling steel balls 3. A lubricating oil 7 for lubricating a rolling portion of the balls is poured in the machine body 1. The above-described rolling steel balls 3 and the guide plate 4 are formed of a high carbon-chromium bearing steel (SUJ2) prescribed by JIS G 4805 (Japanese Industrial Standards). As the above-described lubricating oil 7, paraffin type lubricating oil (viscosity at 40° C.: 67.2 $mm^2/S$) and turbine oil can be used.

The rolling life of the respective plate-shaped wear resistant members of this Example was determined in such a manner that a circular track having a diameter of 40 mm was set on the upper surface of the wear resistant member 2, three rolling steel balls each having a diameter of 9.525 mm and made of SUJ2 were set on the circular track, and the rolling steel balls were rotated on the track at a rotation speed of 1200 rpm under the condition that a load of 3.92 KN was applied to the steel balls. Thus, the rolling life (repeated cycle number) defined as a rotation number until the surface of the above-described silicon nitride wear resistant member 2 peeled off was determined. The measurement results are shown in Table 1.

TABLE 1

| Sample | Porosity (%) | Three point bending strength (MPa) | Fracture toughness (MPa · m$^{1/2}$) | Electric resistance (Ω · cm) | Rolling fatigue life (cycle) |
| --- | --- | --- | --- | --- | --- |
| Example 1 | Up to 0.01 | 1115 | 6.7 | $1 \times 10^5$ | $>1 \times 10^7$ |
| Comparative example 1 | Up to 0.01 | 1050 | 6.9 | $10^{13}$ | $>1 \times 10^7$ |
| Comparative example 2 | Up to 0.01 | 975 | 6.5 | $5 \times 10^8$ | $>1 \times 10^7$ |
| Comparative example 3 | Up to 0.01 | 1000 | 6.8 | $10^{12}$ | $>1 \times 10^7$ |

As is clear from the results shown in Table 1, the silicon nitride type wear resistant member of Example 1, which contained predetermined amounts of the silicon carbide powder and the molybdenum carbide powder as electro-conductivity rendering particles, could obtain a predetermined electric resistance at which the static electricity could be prevented from being retained. In addition, the generation of pores was suppressed. The mechanical strength was superior. Thus, the silicon nitride type wear abrasion resistant member having a superior durability, i.e., a rolling life of more than $1 \times 10^7$ could be obtained.

In Comparative Example 1 in which neither the SiC powder nor the Mo$_2$C powder was added as electro-conductivity rendering particles, a predetermined low electric resistance could not be obtained at all, although the fracture toughness was enhanced.

On the other hand, in Comparative Example 2 in which the Mo$_2$C powder was not added as electroconductivity rendering particles, and in Comparative Example 3 in which the SiC powder was not added as electroconductivity rendering particles, predetermined low electric resistance could not be obtained at all, although no significant difference was caused in the rolling life.

Hereinafter, the case in which the silicon nitride type wear resistant member of the present invention is applied to a rolling ball of a bearing member is specifically described with reference to the following Examples and Comparative Examples.

EXAMPLE 1B AND COMPARATIVE EXAMPLES 1B TO 3B

Each of the blended granulated powders as prepared in Example 1 and Comparative Examples 1 to 3 was packed in a molding die and pressed thereby to prepare spherical primary molded bodies. Then, each of the spherical primary molded bodies was subjected to rubber pressing treatment at a low molding pressure of 980 MPa. Thereby, spherically molded bodies as samples for measuring the crush strength and the rolling life were prepared.

Next, after the respective spherically molded bodies were subjected to the degreasing treatment, the sintering, and the HIP treatment under the same condition as in Example 1. Thus, silicon nitride type sintered bodies having a high density were formed. The formed sintered bodies were subjected to grinding work, so that the sintered bodies were formed in a ball shape with a diameter of 9.525 mm and a surface roughness Ra of 0.01 μm. Thus, rolling balls for bearing as the wear resistant members of Example 1B and Comparative Examples 1B to 3B were prepared. In this connection, the above-described surface roughness was determined as an average surface roughness (Ra) obtained by measuring the surface on the equator of the ball by means of a protllometer-type surface roughness meter.

Regarding the rolling balls as the wear resistant members of the respective Examples and Comparative Examples, the crushing strength, the rolling fatigue life, and defects which occur due to static electricity were checked or measured.

The crush strength was measured by using an Instron type universal testing machine in which two steel balls are arranged so as to overlap each other in the vertical direction and which is prescribed by the former JIS-B-1501, at a cross head speed of 5 mm/minute.

The rolling (fatigue) life was measured by using the thrust type rolling abrasion testing machine shown in FIG. 1. In Example 1 and so forth, the evaluation object was the flat-plate shaped wear resistant member 2, and the balls rolling on the surface of the wear resistant member 2 were rolling steel balls 3 made of SUJ2. On the other hand, in Example 1B and Comparative Examples 1B to 3B, the evaluation objects were the silicon nitride type rolling balls 8. Thus, a bearing steel plate 9 made of SUJ2 was disposed instead of the wear resistant member 2.

Referring to the rolling fatigue life of the respective rolling balls, three rolling balls 8 each having a diameter of 9.525 mm were formed of the wear resistant member as described above. A circular track having a diameter of 40 mm was set on the upper surface of the SUJ2 steel plate 2. The above-described rolling balls 8 were arranged on the circular track. A load was applied to the rolling balls 8 in such a manner that a maximum contact stress of 5.9 GPa acted on the rolling balls 8 under an turbine-oil-bath lubricating condition. In this state, the rolling balls were rotated at a rotation speed of 1200 rpm. Thus, the rolling (fatigue) life was measured as a time period until the surfaces of the silicon nitride type sintered body rolling balls 8 peeled off.

Moreover, whether defects, which would occur due to static electricity, were present or not was checked or determined as follows: the respective rolling balls were incorporated as the bearings of a spindle motor which is applied to rotate a hard disk drive. The spindle motor was continuously driven at a rotation speed of 8000 rpm for 200 hours. In this case, whether defects which would occur due to static electricity were present or not was checked. That is, whether defects were present or not was determined, based on whether the hard disk drive could be normally operated or not.

As the other being members used in the rolling abrasion test, a rotation shaft made of bearing steel SUJ2 and a ball bearing were used. Table 2 shows the measurement and evaluation results.

TABLE 2

| Sample | Crushing strength (MPa) | Rolling fatigue life (hr) | Defects by static electricity |
| --- | --- | --- | --- |
| Example 1B | 270 | >400 | No defect |
| Comparative example 1B | 250 | >400 | Defects |
| Comparative example 2B | 220 | >400 | Defects |
| Comparative example 3B | 235 | >400 | Defects |

As is clear from the results shown in Table 2, the silicon nitride type rolling ball of Example 1B, which was formed by addition of predetermined amounts of the silicon carbide powder and the molybdenum carbide powder, could be rendered such a predetermined electric resistance that the retention of static electricity could be prevented. Thus, defects which would occur due to the static electricity were completely prevented, and, moreover, the rolling life exceeded 400 hours. Thus, the silicon nitride type wear resistant member excellent in durability was produced.

In Comparative Example 1B in which neither the SiC powder nor the $Mo_2C$ powder was added as electro-conductivity rendering particles, in Comparative Example 2B in which the $Mo_2C$ powder was not added as electroconductivity rendering particles, and in Comparative Example 3B in which the SiC powder was not added as electroconductivity rendering particles, predetermined low electric resistance could not be obtained at all, although no significant difference was caused in the rolling fatigue life. Thus, defects occurred due to static electricity.

Hereinafter, plate-shaped wear resistant members prepared using compositions and treatment conditions different from those of the above described Examples are specifically described with reference to the following Examples and Comparative Examples.

EXAMPLES 2 TO 20

In Examples 2 to 20, the same silicon nitride raw material powder as used in Example 1, the SiC powder, $Mo_2C$ powder, $Y_2O_3$ powder, $Al_2O_3$ powder, various rare earth element oxide powders each having an average grain size of 0.9 to 1.0 μm shown in Table 3, $TiO_2$ powder having an average grain size of 0.5 μm, AlN powder having an average grain size of 1.0 μm, and various compound powders each having an average grain size of 0.4 to 0.5 μm were blended in such amounts as to give the composition ratios shown Table 3. Thus, material mixtures were prepared.

The material mixtures were subjected to molding and degreasing under the same conditions as in Example 1, and thereafter, sintered under the conditions shown in Table 3, and HIP-treated. Thereby, silicon nitride type wear resistant members of Examples 2 to 20 were prepared.

COMPARATIVE EXAMPLES 4 TO 10

In Comparative Examples 4 to 10, material mixtures were prepared as shown in Table 3, in such a manner that an excessively small amount of SiC was added (Comparative Example 4), an excessively large amount of SiC was added, and the content of $Si_3N_4$ was excessively small (Comparative Example 5), an excessively small amount of $Mo_2C$ was added (Comparative Example 6), an excessively large amount of $Mo_2C$ was added (Comparative Example 7), an excessively small amount of $Y_2O_3$ was added (Comparative Example 8), an excessively large amount of $Y_2O_3$ was added (Comparative Example 9), and an amount larger than the desired amount-range of $TiO_2$ was added (Comparative Example 10).

Then, the obtained material mixtures were subjected to molding and degreasing under the same conditions as in Example 3, to sintering under the conditions shown in Table 3, and then to the HIP treatment. Thereby, the silicon nitride type wear resistant members of Comparative Examples 4 to 10 were prepared.

Regarding the silicon nitride type wear resistant members of the respective Examples and Comparative Examples prepared as described above, the porosity, the electric resistance, the three point bending at room temperature, the fracture toughness, and the rolling fatigue life were measured under the same conditions as in Example 1. Table 3 shows the results.

TABLE 3

| Sample | | $Si_3N_4$ | SiC | Electro-conductivity rendering agent Other component | | Rare earth element oxide | | $Al_2O_3$ | AlN | Other component | | Sintering condition temperature × time × pressure (° C.) × (hr) × (MPa) |
|---|---|---|---|---|---|---|---|---|---|---|---|---|
| Example | 2 | 65 | 12 | $Mo_2C$ | 12 | $Y_2O_3$ | 4 | 3 | 3 | $TiO_2$ | 1 | 1800 × 4 × 0.7 |
| | 3 | 59 | 20 | $Mo_2C$ | 10 | $Y_2O_3$ | 4 | 3 | 3 | $TiO_2$ | 1 | 1800 × 4 × 0.7 |
| | 4 | 58 | 28 | $Mo_2C$ | 3 | $Y_2O_3$ | 4 | 3 | 3 | $TiO_2$ | 1 | 1800 × 4 × 0.7 |
| | 5 | 55 | 19 | $Mo_2C$ | 15 | $Y_2O_3$ | 4 | 3 | 3 | $TiO_2$ | 1 | 1800 × 4 × 0.7 |
| | 6 | 75 | 17 | $Mo_2C$ | 4 | $Y_2O_3$ | 2 | 2 | — | — | — | 1850 × 4 × 0.9 |
| | 7 | 63 | 16 | $Mo_2C$ | 8 | $Y_2O_3$ | 10 | 2 | 1 | — | — | 1800 × 4 × 0.7 |
| | 8 | 62 | 16 | $Mo_2C$ | 8 | $Y_2O_3$ | 4 | 5 | 4 | $TiO_2$ | 1 | 1800 × 4 × 0.7 |
| | 9 | 64 | 16 | $Mo_2C$ | 10 | $Y_2O_3$ | 4 | 3 | 2 | $TiO_2$ | 1 | 1850 × 4 × 0.9 |
| | 10 | 63 | 20 | $Mo_2C$ | 3 | $Y_2O_3$ | 4 | 3 | 2 | $TiO_2$ | 5 | 1800 × 4 × 0.7 |
| | 11 | 58 | 20 | $Mo_2C$ | 10 | $Y_2O_3$ | 4 | 3 | 3 | $ZrO_2$ | 2 | 1800 × 4 × 0.7 |
| | 12 | 58 | 20 | $Mo_2C$ | 10 | $Y_2O_3$ | 4 | 3 | 3 | $HfO_2$ | 2 | 1800 × 4 × 0.7 |
| | 13 | 64 | 16 | $MoSi_2$ | 10 | $Y_2O_3$ | 4 | 3 | 2 | $TiO_2$ | 1 | 1800 × 4 × 0.7 |
| | 14 | 64 | 16 | WC | 10 | $Y_2O_3$ | 4 | 3 | 2 | $TiO_2$ | 1 | 1800 × 4 × 0.7 |
| | 15 | 64 | 16 | TaC | 10 | $Y_2O_3$ | 4 | 3 | 2 | $TiO_2$ | 1 | 1800 × 4 × 0.7 |
| | 16 | 64 | 16 | NbC | 10 | $Y_2O_3$ | 4 | 3 | 2 | $TiO_2$ | 1 | 1800 × 4 × 0.7 |
| | 17 | 61 | 16 | $Mo_2C$ | 10 | $Er_2O_3$ | 7 | 3 | 2 | $TiO_2$ | 1 | 1800 × 4 × 0.7 |
| | 18 | 63 | 16 | $Mo_2C$ | 10 | $CeO_2$ | 5 | 3 | 2 | $TiO_2$ | 1 | 1800 × 4 × 0.7 |
| | 19 | 63 | 16 | $Mo_2C$ | 10 | $Nd_2O_3$ | 5 | 3 | 2 | $TiO_2$ | 1 | 1800 × 4 × 0.7 |
| | 20 | 61 | 16 | $Mo_2C$ | 10 | $Dy_2O_3$ | 7 | 3 | 2 | $TiO_2$ | 1 | 1800 × 4 × 0.7 |
| Comparative example | 4 | 71 | 10 | $Mo_2C$ | 8 | $Y_2O_3$ | 4 | 3 | 3 | $TiO_2$ | 1 | 1800 × 4 × 0.7 |
| | 5 | 53 | 30 | $Mo_2C$ | 6 | $Y_2O_3$ | 4 | 3 | 3 | $TiO_2$ | 1 | 1800 × 4 × 0.7 |
| | 6 | 70 | 17 | $Mo_2C$ | 2 | $Y_2O_3$ | 4 | 3 | 3 | $TiO_2$ | 1 | 1800 × 4 × 0.7 |
| | 7 | 53 | 19 | $Mo_2C$ | 17 | $Y_2O_3$ | 4 | 3 | 3 | $TiO_2$ | 1 | 1800 × 4 × 0.7 |
| | 8 | 66 | 16 | $Mo_2C$ | 10 | $Y_2O_3$ | 1 | 3 | 3 | $TiO_2$ | 1 | 1850 × 4 × 0.9 |
| | 9 | 55 | 16 | $Mo_2C$ | 10 | $Y_2O_3$ | 12 | 3 | 3 | $TiO_2$ | 1 | 1800 × 4 × 0.7 |

TABLE 3-continued

| | | 10 | 61 | 20 | Mo₂C | 3 | Y₂O₃ | 4 | 3 | 2 | TiO₂ | 7 | 1800 × 4 × 0.7 |

| Sample | | HIP condition temperature × time × pressure (° C.) × (hr) × (MPa) | Porosity (%) | Electric resistance ($\Omega \cdot cm$) | Three point bending strength (MPa) | Fracture toughness (MPa·m$^{1/2}$) | Rolling fatigue life (cycle) |
|---|---|---|---|---|---|---|---|
| Example | 2 | 1700 × 1 × 98 | Up to 0.01 | $9 \times 10^6$ | 1020 | 6.5 | $>1 \times 10^7$ |
| | 3 | 1700 × 1 × 98 | Up to 0.01 | $4 \times 10^4$ | 1040 | 6.3 | $>1 \times 10^7$ |
| | 4 | 1700 × 1 × 98 | Up to 0.01 | $2 \times 10^5$ | 1020 | 6.1 | $>1 \times 10^7$ |
| | 5 | 1700 × 1 × 98 | Up to 0.01 | $1 \times 10^4$ | 960 | 6.1 | $>1 \times 10^7$ |
| | 6 | 1700 × 1 × 98 | Up to 0.01 | $1 \times 10^7$ | 950 | 6.2 | $>1 \times 10^7$ |
| | 7 | 1700 × 1 × 98 | Up to 0.01 | $1 \times 10^6$ | 1000 | 6.5 | $>1 \times 10^7$ |
| | 8 | 1700 × 1 × 30 | Up to 0.01 | $9 \times 10^5$ | 1050 | 6.4 | $>1 \times 10^7$ |
| | 9 | — | 0.2 | $2 \times 10^5$ | 980 | 6.6 | $>1 \times 10^7$ |
| | 10 | 1700 × 1 × 98 | Up to 0.01 | $3 \times 10^6$ | 1040 | 6.1 | $>1 \times 10^7$ |
| | 11 | 1700 × 1 × 98 | Up to 0.01 | $5 \times 10^4$ | 1070 | 6.4 | $>1 \times 10^7$ |
| | 12 | 1700 × 1 × 98 | Up to 0.01 | $4 \times 10^4$ | 1080 | 6.4 | $>1 \times 10^7$ |
| | 13 | 1700 × 1 × 98 | Up to 0.01 | $9 \times 10^4$ | 1080 | 6.6 | $>1 \times 10^7$ |
| | 14 | 1700 × 1 × 98 | Up to 0.01 | $5 \times 10^5$ | 1050 | 6.4 | $>1 \times 10^7$ |
| | 15 | 1700 × 1 × 98 | Up to 0.01 | $3 \times 10^5$ | 1100 | 6.6 | $>1 \times 10^7$ |
| | 16 | 1700 × 1 × 98 | Up to 0.01 | $9 \times 10^4$ | 1120 | 6.7 | $>1 \times 10^7$ |
| | 17 | 1700 × 1 × 98 | Up to 0.01 | $1 \times 10^5$ | 1100 | 6.7 | $>1 \times 10^7$ |
| | 18 | 1700 × 1 × 98 | Up to 0.01 | $1 \times 10^5$ | 1010 | 6.6 | $>1 \times 10^7$ |
| | 19 | 1700 × 1 × 98 | Up to 0.01 | $2 \times 10^5$ | 1080 | 6.5 | $>1 \times 10^7$ |
| | 20 | 1700 × 1 × 30 | Up to 0.01 | $1 \times 10^5$ | 1100 | 6.6 | $>1 \times 10^7$ |
| Comparative example | 4 | 1700 × 1 × 98 | Up to 0.01 | $1 \times 10^8$ | 1100 | 6.8 | $>1 \times 10^7$ |
| | 5 | 1700 × 1 × 98 | Up to 0.01 | $1 \times 10^4$ | 920 | 5.8 | $8 \times 10^8$ |
| | 6 | 1700 × 1 × 98 | Up to 0.01 | $2 \times 10^8$ | 1070 | 6.7 | $>1 \times 10^7$ |
| | 7 | 1700 × 1 × 98 | 0.05 | $8 \times 10^3$ | 890 | 5.9 | $8 \times 10^8$ |
| | 8 | 1700 × 1 × 98 | 0.1 | $4 \times 10^5$ | 870 | 5.7 | $7 \times 10^8$ |
| | 9 | 1700 × 1 × 98 | Up to 0.01 | $2 \times 10^5$ | 900 | 5.9 | $8 \times 10^8$ |
| | 10 | 1700 × 1 × 98 | Up to 0.01 | $2 \times 10^6$ | 890 | 6.0 | $9 \times 10^8$ |

As is clear from the results shown in Table 3, in the case of the wear resistant members of the respective Examples, which were formed by addition of predetermined amounts of the rare earth elements, and the silicon carbide powder and the molybdenum carbide powder as electroconductivity rendering particles, and so forth, could be rendered a predetermined electric resistance at which the retention of static electricity can be prevented. Moreover, the generation of pores could be suppressed. The mechanical strength characteristic was high, and the rolling fatigue life exceeded $1 \times 10^7$ cycles. Thus, the silicon nitride type wear resistant members having a superior durability could be produced.

On the other hand, as shown in Comparative Examples 4 to 10, in the case of the sintered bodies in which the addition amounts of the electro-conductivity rendering particles, the rare earth element components, and so forth departed from the preferred range according to the present invention, the rolling lives of the surfaces the wear resistant members were short. Thus, it was ascertained that one of the characteristics, i.e., the electric resistances, the three point strengths, the fracture toughness of the sintered bodies, and so forth could not meet the requirements for the characteristics specified according to the present invention.

Next, the wear resistant members of Examples 2 to 20 and Comparative Examples 4 to 10 were applied to the rolling balls of a bearing member. This will be specifically described with reference to the following Examples and Comparative Examples.

EXAMPLES 2B TO 20B AND COMPARATIVE EXAMPLES 4B TO 10B

Each of the blended granulated powders as prepared in Examples 2 to 20 and Comparative Examples 4 to 10 was packed in a molding die and pressed thereby to prepare spherical molded bodies. Then, each of the spherical primary molded bodies was subjected to rubber pressing treatment at a molding pressure of 980 MPa. Thereby, spherically molded bodies as samples for measuring the crush strength and the rolling fatigue life were prepared.

Next, after the respective spherically molded bodies were subjected to the degreasing treatment under the same conditions as in Example 1, and then, were treated under the conditions for the holding on the way of sintering, the sintering conditions, the cooling speed after the sintering, and the HIP conditions shown in Table 4. The formed sintered bodies were subjected to grinding work, so that the sintered bodies were formed in a ball shape with a diameter of 9.525 mm and a surface roughness Ra of 0.01 μm. Thus, rolling balls for bearing as the wear resistant members of Examples 2B to 20B and Comparative Examples 4B to 10B were prepared. In this connection, the above-described surface roughness was determined as an average surface roughness (Ra) obtained by measuring the surface on the equator of the rolling ball by means of a protllometer-type surface roughness meter.

Regarding the rolling balls as the wear resistant members of the respective Examples and Comparative Examples prepared as described above, the crushing strength, the rolling (fatigue) life, and defects which occur due to static electricity were checked or measured in the same manner as in Example 1B. The measured results are shown in Table 4 hereunder.

TABLE 4

| | Sample | Material composition (mass %) | | | | | | | | Sintering condition temperature × time × pressure (° C.) × (hr) × (MPa) | HIP condition temperature × time × pressure (° C.) × (hr) × (MPa) | Crushing strength (MPa) | Rolling fatigue life (hr) | Defects by static electricity |
|---|---|---|---|---|---|---|---|---|---|---|---|---|---|---|
| | | $Si_3N_4$ | SiC | Electroconductivity rendering agent Other component | | Rare earth element oxide | | $Al_2O_3$ | AlN | Other component | | | | | |
| Example | 2B | 65 | 12 | $Mo_2C$ | 12 | $Y_2O_3$ | 4 | 3 | 3 | $TiO_2$ | 1 | 1800 × 4 × 0.7 | 1700 × 1 × 98 | 240 | >400 | No defect |
| | 3B | 59 | 20 | $Mo_2C$ | 10 | $Y_2O_3$ | 4 | 3 | 3 | $TiO_2$ | 1 | 1800 × 4 × 0.7 | 1700 × 1 × 98 | 250 | >400 | No defect |
| | 4B | 58 | 28 | $Mo_2C$ | 3 | $Y_2O_3$ | 4 | 3 | 3 | $TiO_2$ | 1 | 1800 × 4 × 0.7 | 1700 × 1 × 98 | 230 | >400 | No defect |
| | 5B | 55 | 19 | $Mo_2C$ | 15 | $Y_2O_3$ | 4 | 3 | 3 | $TiO_2$ | 1 | 1800 × 4 × 0.7 | 1700 × 1 × 98 | 260 | >400 | No defect |
| | 6B | 75 | 17 | $Mo_2C$ | 4 | $Y_2O_3$ | 2 | 2 | — | — | — | 1850 × 4 × 0.9 | 1700 × 1 × 98 | 210 | >400 | No defect |
| | 7B | 63 | 16 | $Mo_2C$ | 8 | $Y_2O_3$ | 10 | 2 | 1 | — | — | 1800 × 4 × 0.7 | 1700 × 1 × 98 | 220 | >400 | No defect |
| | 8B | 62 | 16 | $Mo_2C$ | 8 | $Y_2O_3$ | 4 | 5 | 4 | $TiO_2$ | 1 | 1800 × 4 × 0.7 | 1700 × 1 × 30 | 255 | >400 | No defect |
| | 9B | 64 | 16 | $Mo_2C$ | 10 | $Y_2O_3$ | 4 | 3 | 2 | $TiO_2$ | 1 | 1850 × 4 × 0.9 | — | 230 | >400 | No defect |
| | 10B | 63 | 20 | $Mo_2C$ | 3 | $Y_2O_3$ | 4 | 3 | 2 | $TiO_2$ | 5 | 1800 × 4 × 0.7 | 1700 × 1 × 98 | 240 | >400 | No defect |
| | 11B | 58 | 20 | $Mo_2C$ | 10 | $Y_2O_3$ | 4 | 3 | 3 | $ZrO_2$ | 2 | 1800 × 4 × 0.7 | 1700 × 1 × 98 | 250 | >400 | No defect |
| | 12B | 58 | 20 | $Mo_2C$ | 10 | $Y_2O_3$ | 4 | 3 | 3 | $HfO_2$ | 2 | 1800 × 4 × 0.7 | 1700 × 1 × 98 | 255 | >400 | No defect |
| | 13B | 64 | 16 | $MoSi_2$ | 10 | $Y_2O_3$ | 4 | 3 | 2 | $TiO_2$ | 1 | 1800 × 4 × 0.7 | 1700 × 1 × 98 | 250 | >400 | No defect |
| | 14B | 64 | 16 | WC | 10 | $Y_2O_3$ | 4 | 3 | 2 | $TiO_2$ | 1 | 1800 × 4 × 0.7 | 1700 × 1 × 30 | 240 | >400 | No defect |
| | 15B | 64 | 16 | TaC | 10 | $Y_2O_3$ | 4 | 3 | 2 | $TiO_2$ | 1 | 1800 × 4 × 0.7 | 1700 × 1 × 30 | 250 | >400 | No defect |
| | 16B | 64 | 16 | NbC | 10 | $Y_2O_3$ | 4 | 3 | 2 | $TiO_2$ | 1 | 1800 × 4 × 0.7 | 1700 × 1 × 30 | 270 | >400 | No defect |
| | 17B | 61 | 16 | $Mo_2C$ | 10 | $Er_2O_3$ | 7 | 3 | 2 | $TiO_2$ | 1 | 1800 × 4 × 0.7 | 1700 × 1 × 30 | 260 | >400 | No defect |
| | 18B | 63 | 16 | $Mo_2C$ | 10 | $CeO_2$ | 5 | 3 | 2 | $TiO_2$ | 1 | 1800 × 4 × 0.7 | 1700 × 1 × 30 | 230 | >400 | No defect |
| | 19B | 63 | 16 | $Mo_2C$ | 10 | $Nd_2O_3$ | 5 | 3 | 2 | $TiO_2$ | 1 | 1800 × 4 × 0.7 | 1700 × 1 × 30 | 240 | >400 | No defect |
| | 20B | 61 | 16 | $Mo_2C$ | 10 | $Dy_2O_3$ | 7 | 3 | 2 | $TiO_2$ | 1 | 1800 × 4 × 0.7 | 1700 × 1 × 30 | 250 | >400 | No defect |
| Comparative example | 4B | 71 | 8 | $Mo_2C$ | 8 | $Y_2O_3$ | 4 | 3 | 3 | $TiO_2$ | 1 | 1800 × 4 × 0.7 | 1700 × 1 × 98 | 250 | >400 | Defects |
| | 5B | 53 | 30 | $Mo_2C$ | 6 | $Y_2O_3$ | 4 | 3 | 3 | $TiO_2$ | 1 | 1800 × 4 × 0.7 | 1700 × 1 × 98 | 190 | 355 | No defect |
| | 6B | 70 | 17 | $Mo_2C$ | 2 | $Y_2O_3$ | 4 | 3 | 3 | $TiO_2$ | 1 | 1800 × 4 × 0.7 | 1700 × 1 × 98 | 230 | >400 | Defects |
| | 7B | 53 | 19 | $Mo_2C$ | 17 | $Y_2O_3$ | 4 | 3 | 3 | $TiO_2$ | 1 | 1800 × 4 × 0.7 | 1700 × 1 × 98 | 185 | 330 | No defect |
| | 8B | 66 | 16 | $Mo_2C$ | 10 | $Y_2O_3$ | 1 | 3 | 3 | $TiO_2$ | 1 | 1850 × 4 × 0.9 | 1700 × 1 × 98 | 180 | 345 | No defect |
| | 9B | 55 | 16 | $Mo_2C$ | 10 | $Y_2O_3$ | 12 | 3 | 3 | $TiO_2$ | 1 | 1800 × 4 × 0.7 | 1700 × 1 × 98 | 200 | 360 | No defect |
| | 10B | 61 | 20 | $Mo_2C$ | 3 | $Y_2O_3$ | 4 | 3 | 2 | $TiO_2$ | 7 | 1800 × 4 × 0.7 | 1700 × 1 × 98 | 190 | 370 | No defect |

As is clear from the results shown in Table 4, in the case of the wear resistant members of the respective Examples, which were formed by addition of the predetermined amounts of the rare earth elements, and the silicon carbide powder and the molybdenum carbide powder as electroconductivity rendering particles, and so forth, could be rendered a predetermined electric resistance at which the retention of static electricity can be prevented. Moreover, the generation of pores was suppressed. The crushing strength was superior, and the rolling (fatigue) life exceeded 400 hours. Thus, the silicon nitride type wear resistant members having a superior durability could be produced.

On the other hand, as shown in Comparative Examples 4B to 10B, regarding the sintered bodies in which the addition amounts of the electroconductivity rendering particles, the rare earth element components, and so forth departed from the preferred ranges specified in the present invention, it was found that the rolling (fatigue) lives of the rolling balls were short as a whole, or one of the characteristics of the crushing strength, the defects occurring due to the static electricity, and so forth of the sintered bodies could not meet the requirements for the characteristics specified according to the present invention, although the sintering operation and the HIP treatment were carried out under the same conditions as in the Example.

INDUSTRIAL APPLICABILITY

As described above, according to the wear resistant members and the method of producing the same of the present invention, in preparation of the silicon nitride sintered body to constitute the wear resistant member, predetermined amounts of silicon carbide, a Mo compound, and the like as electroconductivity rendering particles are added to silicon nitride material powder, and the obtained material mixture is degreased and sintered under the specified conditions. Thus, the silicon carbide or the like is dispersed in the crystal texture of the silicon nitride sintered body, so that a predetermined electric resistance ($10^7$ to $10^4$ Ω·cm is obtained. Thus, the electroconductivity at which the generation of static electricity can be effectively suppresses can be rendered.

Moreover, the silicon nitride, the Mo compound, and the like are added together in the predetermined amounts. Therefore, the sintering property is hardly deteriorated, and the generation of pores is suppressed, so that the porosity can be reduced to have an extremely small value. Thus, the wear resistant member which is hardly affected by static electricity, and has a high rolling fatigue life characteristic and a superior durability is obtained. Therefore, in the case in which a bearing unit is produced in which the wear resistant member is employed as a rolling bearing member, the sliding rolling characteristic can be kept on a high level for a long time-period. Thus, rotation devices having superior operation-reliability and durability can be provided. Regarding other uses, the present invention can be applied to different fields involving engine parts, various jigs, tools, rails, and rollers, and so forth, for which a high wear resistance is required.

The invention claimed is:

1. A silicon nitride wear resistant member comprised of a ceramic sintered body comprising
   55 to 75 mass % of silicon nitride,
   12 to 28 mass % of silicon carbide,
   3 to 15 mass % of at least one element selected from the group consisting of Mo, W, Ta, and Nb in terms of silicide thereof, and 5 to 15 mass % of grain boundary phase comprised of a rare earth element-Si—Al—O—N, wherein the wear resistant member has an electrical resistance of $10^7$ to $10^4$ Ω·cm, a porosity of 1% or less, and a three point bending strength of 900 MPa or more.

2. The silicon nitride wear resistant member according to claim 1, wherein the wear resistant member has a fracture toughness of 6.0 MPa·m$^{1/2}$ or more.

3. The silicon nitride type wear resistant member according to claim 1, wherein the wear resistant member further comprises 5 mass % or less of at least one element selected from the group consisting of Ti, Hf, and Zr in terms of the oxide thereof.

4. The silicon nitride wear resistant member according to claim 1, wherein a rolling life, defined as a rotation number of steel balls rolling along a circular track formed on the wear resistant member formed of the silicon nitride sintered body until a surface of the silicon nitride wear resistant member peels off is $1 \times 10^7$ or more, wherein the rolling life is measured by setting a circular track having a diameter of 40 mm on the upper surface of the plate-shaped wear resistant member, providing the three rolling steel balls each having a diameter of 9.525 mm and comprised of SUJ2 on the circular track, thereby forming a thrust type bearing testing machine, and rotating the rolling steel balls on the track at a rotation speed of 1200 rpm while applying a load of 3.92 KN.

5. The silicon nitride wear resistant member according to claim 1, wherein the silicon nitride sintered body has a crush strength of 200 MPa or more, and a rolling fatigue life defined as a time until a surface of rolling balls comprised of the silicon nitride wear resistant member rolling along a circular track on a steel plate peels off, is 400 hours or more, wherein the rolling fatigue life is measured by forming three rolling balls each having a diameter of 9.525 mm from the silicon nitride wear resistant member, providing the three rolling balls on the circular track having a diameter of 40 mm set on the upper surface of a steel plate formed of SUJ2, thereby to form forming a thrust type bearing testing machine, and rotating the rolling ball at a rotation speed of 1200 rpm on the track while applying a load to impact a maximum contact stress of 5.9 GPa to the balls.

6. The silicon nitride wear resistant member according to claim 1, wherein the porosity of the ceramic sintered body is 0.5% or less.

7. The silicon nitride wear resistant member according to claim 1, wherein the porosity of the ceramic sintered body is 0.2% or less.

8. The silicon nitride wear resistant member according to claim 1, wherein the porosity of the ceramic sintered body is 0.01% or less.

9. The silicon nitride wear resistant member according to claim 1, wherein the at least one element comprises Mo.

10. The silicon nitride wear resistant member according to claim 1, comprising 60 to 70 mass % of silicon nitride, 15 to 25 mass % of silicon carbide, 5 to 13 mass % of said at least one element in terms of silicide thereof, and 7 to 13 mass % of said grain boundary phase.

11. The method of manufacturing a silicon nitride wear resistant member according to claim 1, the method comprising:

preparing a material mixture by adding 12 to 28 mass % of silicon carbide, 3 to 15 mass % of at least one compound selected from the group consisting of the carbides, the suicides, and the oxides of Mo, W, Ta, and Nb in terms of the suicide thereof, 2 to 10 mass % of a rare earth element in terms of the oxide thereof, 2 to 10 mass % of aluminum in terms of the oxide thereof, and 5 mass % or less of at least one element selected from the group consisting of Ti, Hf, and Zr in terms of oxide thereof to silicon nitride powder comprising 1.7 mass % or less of oxygen and 90 mass % or more of α phase type silicon nitride, and having an average grain size of 0.1 μm or less;

molding the material mixture to form a compact;

degreasing the compact; and sintering the compact in a non-oxidizing atmosphere at a temperature of 1850° C. or lower.

12. The method of manufacturing a silicon nitride wear resistant member according to claim 11, wherein the method further comprises:

conducting a hot isostatic pressing treatment (HIP) in a non-oxidizing atmosphere of 30 MPa or more at a temperature of 1800° C. or lower after said sintering.

* * * * *